(12) United States Patent
Bauer et al.

(10) Patent No.: US 8,343,415 B2
(45) Date of Patent: Jan. 1, 2013

(54) CERAMIC PARTICULATE MATERIAL AND PROCESSES FOR FORMING SAME

(75) Inventors: Ralph Bauer, Niagara Falls (CA);
Andrew G. Haerle, Sutton, MA (US);
Doruk O. Yener, Grafton, MA (US);
Claire M. Theron, Marlboro, MA (US);
Michael D. Kavanaugh, North Grafton, MA (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 13/406,299

(22) Filed: Feb. 27, 2012

(65) Prior Publication Data

US 2012/0153547 A1 Jun. 21, 2012

Related U.S. Application Data

(62) Division of application No. 12/014,418, filed on Jan. 15, 2008, now abandoned.

(60) Provisional application No. 60/884,925, filed on Jan. 15, 2007.

(51) Int. Cl.
*C04B 35/645* (2006.01)

(52) U.S. Cl. ........................ 264/681; 264/604

(58) Field of Classification Search .................. 264/604, 264/661
See application file for complete search history.

(56) References Cited

U.S. PATENT DOCUMENTS

| | | | |
|---|---|---|---|
| 4,053,579 A | 10/1977 | Kato et al. | |
| 4,657,754 A | 4/1987 | Bauer et al. | |
| 4,818,515 A | 4/1989 | Ceresa et al. | |
| 4,944,905 A | 7/1990 | Gibb et al. | |
| 5,185,299 A | 2/1993 | Wood et al. | |
| 5,254,832 A | 10/1993 | Gartner et al. | |
| 5,527,423 A | 6/1996 | Neville et al. | |
| 5,593,468 A | 1/1997 | Khaund et al. | |
| 5,641,469 A | 6/1997 | Garg et al. | |

(Continued)

FOREIGN PATENT DOCUMENTS

CA 2073471 5/1998

(Continued)

OTHER PUBLICATIONS

Richard A. Shelleman, "A kinetic and microstructural study of gamma to alpha alumina phase transformation: Effect of controlled nucleation and alternative material transport paths," PhD thesis, The Pennsylvania State University, 217 pgs, 1988.

(Continued)

*Primary Examiner* — Matthew Daniels
*Assistant Examiner* — Erin Snelting
(74) *Attorney, Agent, or Firm* — Mike W. Crosby; Abel Law Group, LLP

(57) ABSTRACT

Processes for forming ceramic particulate material. The ceramic particulate material includes alumina particles, the particles having a specific surface area (SSA) not less than 15 $m^2/g$ and not greater than 75 $m^2/g$ and a sphericity quantified by at least one of (i) a mean roundness not less than 0.710 as measured by Roundness Correlation Image Analysis, and (ii) a concavity less than 20%, wherein concavity is the percent of alumina particles based on a sample of at least 100 particles, which have a concave outer peripheral portion that extends along a distance not less than 10% of $d_{50}$ by TEM inspection, the concave outer peripheral portion having a negative radius of curvature as viewed from an interior of the particle.

27 Claims, 14 Drawing Sheets

U.S. PATENT DOCUMENTS

| | | | |
|---|---|---|---|
| 5,658,838 | A | 8/1997 | Trabelsi |
| 5,935,550 | A | 8/1999 | Mohri et al. |
| 6,048,577 | A | 4/2000 | Garg |
| 6,066,584 | A | 5/2000 | Krell et al. |
| 6,258,137 | B1 | 7/2001 | Garg et al. |
| 6,464,906 | B1 | 10/2002 | Niwa et al. |
| 6,499,680 | B2 | 12/2002 | Schillaci |
| 6,841,497 | B1 | 1/2005 | Krell et al. |
| 6,936,236 | B2 | 8/2005 | Yamamoto et al. |
| 7,078,010 | B2 | 7/2006 | Maki et al. |
| 2003/0185746 | A1 | 10/2003 | Kajihara et al. |
| 2005/0008565 | A1 | 1/2005 | Maki et al. |
| 2005/0214201 | A1 | 9/2005 | Maruno et al. |
| 2005/0276745 | A1 | 12/2005 | Maki et al. |
| 2007/0280877 | A1 | 12/2007 | Suchanek et al. |

FOREIGN PATENT DOCUMENTS

| | | | |
|---|---|---|---|
| CN | 1151070 | C | 6/1997 |
| CN | 1189475 | A | 8/1998 |
| CN | 1342609 | A | 4/2002 |
| CN | 1374251 | A | 10/2002 |
| CN | 1477059 | A | 2/2004 |
| CN | 1539737 | A | 10/2004 |
| CN | 1565975 | A | 1/2005 |
| CN | 1607179 | A | 4/2005 |
| CN | 1669933 | A * | 9/2005 |
| DE | 10109892 | A1 | 9/2002 |
| EP | 0151490 | | 8/1985 |
| EP | 0250616 | A | 1/1988 |
| EP | 0442163 | B1 | 8/1991 |
| EP | 0503598 | A2 | 9/1992 |
| EP | 0735001 | B1 | 10/2001 |
| FR | 2702206 | | 9/1994 |
| JP | 51-139810 | | 12/1976 |
| JP | 58-213633 | | 12/1983 |
| JP | 61-201619 | | 9/1986 |
| JP | 61256921 | A * | 11/1986 |
| JP | 62-158116 | | 7/1987 |
| JP | 63-151616 | | 6/1988 |
| JP | 03-040615 | | 2/1991 |
| JP | 05-017132 | | 1/1993 |
| JP | 06-321534 | | 11/1994 |
| JP | 07-133110 | | 5/1995 |
| JP | 07-206435 | | 8/1995 |
| JP | 2006-026419 | | 2/2006 |
| JP | 2006-265084 | | 10/2006 |
| KR | 20060043612 | A * | 5/2006 |
| TW | 200540116 | A * | 12/2005 |
| WO | 02/08124 | | 1/2002 |
| WO | 03/029145 | | 4/2003 |
| WO | 03/059819 | A1 | 7/2003 |
| WO | 2004/060804 | A1 | 7/2004 |
| WO | 2004/089828 | | 10/2004 |

OTHER PUBLICATIONS

Kennedy, G.C., "Phase Relations in the System Al2O3-H2O At High Temperatures and Pressures," Amer. J. Sci., vol. 257 (1959) pp. 563-573.

Neuhaus, Von, A. et al., "Hydrothermaluntersuchungen im System Al2O3-H2O (I) Zustandsgrenzen und Stabilitaetsverhaeltnisse von Boehmit, Diaspor und Korund im Drukbereich > 50 bar," Ber. Deut. Keram. Ges. 42 (1965) pp. 167-184.

Ervin, Jr., G. et al., "The System Al2O3-H20," J. Geol. vol. 59, pp. 381-394 (1951).

Mizuta, H., et al, "Preparation of High-Strength and Translucent Alumina by Hot Isostatic Pressing," J. Am Ceram Soc., vol. 75, No. 2, pp. 469-473, 1992.

Kwon, O., et al. "Submicrometer Transparent Alumina by Sinter Forging Seeded gamma-Al2O3 Powders," J. Am Ceram. Soc., vol. 78, No. 2, pp. 491-494, 1995.

Krell, A., et al., "Nonocorundum-Advanced Synthesis and Processing," Nanostructured Materials, vol. 11, No. 8, pp. 1141-1153, 1999.

Ma, H., et al., "Synthesis and Processing of Nano-alpha-Al2O3 Powders," 7th Euro Ceramics, Brugge (Belgium), Sep. 9-13, 2001, Key Engineering Materials, vols. 206-213, Part 1, pp. 43-46.

Krell, A., et al., "Effects of the Homogeneity of Particle Coordination on Solid-State Sintering of Transparent Alumina," J. Am Ceram. Soc., vol. 89, No. 6, pp. 1985-1992, 2006.

Hayashi, K., et al., "Transmission Optical Properties of Polycrystalline Alumina with Submicron Grains," Material Transactions, vol. 32, No. 11, pp. 1024-1029, 1991.

U. Popp et al., "Properties of Nanocrystalline Ceramic Powders Prepared by Laser Evaporation and Recondensation," Journal of the European Ceramic Society, Elsevier Science Publishers, Barking, Essex, GB, vol. 18, No. 9, pp. 1153-1160, 1998.

* cited by examiner

CERAMIC PARTICULATE MATERIAL AND PROCESSES FOR FORMING SAME

CROSS-REFERENCE TO RELATED APPLICATION(S)

The present application claims priority from U.S. Non-Provisional patent application Ser. No. 12/014,418, filed Jan. 15, 2008, entitled "CERAMIC PARTICULATE MATERIAL AND PROCESSES FOR FORMING SAME," naming inventors Ralph Bauer, Andrew G. Haerle, Doruk O. Yener, Claire M. Theron, and Michael D. Kavanaugh, which claims priority from U.S. Provisional Patent Application No. 60/884,925, filed Jan. 15, 2007, entitled "CERAMIC PARTICULATE MATERIAL AND PROCESSES FOR FORMING SAME", naming inventors Ralph Bauer, Doruk O. Yener, and Claire M. Theron, which application is incorporated by reference herein in its entirety.

BACKGROUND

1. Field of the Disclosure

The present invention is generally drawn to ceramic particulate material and processes for forming same. In particular, aspects of the present invention are drawn to alumina ceramic particulate material.

2. Description of the Related Art

Alumnus particulate material, including hydrated aluminas, transition-phase aluminas, and the high temperature phase of alumina, alpha-alumina, have been commonly used in various industrial applications, including use as fillers, raw materials for ceramic bodies and abrasives, among many others. Certain industries, including the abrasives industry, can use the particulate material in loose form, deploying the material in a free-abrasive slurry, a coated abrasive, or a bonded abrasive, for example. Within the context of abrasive slurries, a particular species of slurries is utilized for chemical mechanical polishing (CMP), in which the abrasive slurry not only has mechanical properties of abrasion, but also desirable chemical properties assisting in the mechanical removal of material from a work piece.

Other industries take advantage of alumina particulate material as a raw material forming various ceramic bodies. Often times, it is desired that the ceramic bodies are sinterable to a desired density under a confined thermal budget, including limitations on maximum sintering temperature and dwell times. Limitations on the thermal budget may be placed on processing due to temperature limitations on other components in case of a composite, and due to processing costs, for example. However, particular thermal processing parameters are typically balanced against the degree of sintering required by the particular component, and attendant densification.

In light of the forgoing, it is particularly desirable to provide ceramic particulate material, including alumina particles, that has properties which may be advantageous for deployment in various industries including those requiring sintered bodies, abrasives applications, as in the particular case of polishing slurries, and filler applications.

Alumina particulate technologies are mature and the state of the art is well developed. Among the state of the art, particular processing methodologies enable the formation of a wide range of alumina particulate morphologies, which include particular specific surface area (SSA), particle size distribution, primary particle size and secondary particle size characteristics. For example, one process methodology relies upon utilization of a salt raw material for forming the alumina particulate material, such as an aluminum nitrate salt solution. Such solution may be seeded to aid in the transformation of the aluminum salt into the finally desired crystal phase, such as alpha phase alumina. Examples of such approaches are shown in, for example, U.S. Pat. No. 6,841,497 as well as U.S. Pat. No. 7,078,010.

As exemplified by the forgoing patents, nanosized alpha-alumina particulate material may be successfully formed through synthesis based upon utilization of a salt raw material. However, the morphologies and powder characteristics enabled by such approaches are somewhat confined. Other approaches utilized high temperature treatment of an alpha-alumina precursor, such as a hydrated alumina including boehmite, in the presence of seeds, such as alpha-alumina seeds. Such approaches have been successful in the formation of alpha-alumina particulate material for a wide range of applications, but also have limited particle morphologies and characteristics.

SUMMARY

According to one embodiment, a ceramic particulate material includes alumina particles, the particles having a specific surface area (SSA) not less than 15 $m^2/g$ and not greater than 75 $m^2/g$ and a sphericity quantified by at least one of (i) a mean roundness not less than 0.710 as measured by Roundness Correlation Image Analysis, and (ii) a concavity less than 20%, wherein concavity is the percent of alumina particles based on a sample of at least 100 particles, which have a concave outer peripheral portion that extends along a distance not less than 10% of d50 by TEM inspection, the concave outer peripheral portion having a negative radius of curvature as viewed from an interior of the particle.

According to another embodiment, a ceramic particulate material includes alumina particles, the particles having an average primary particle size greater than 60 nm and less than 135 nm as measured by TEM, and a sphericity quantified by at least one of (i) a mean roundness not less than 0.710 as measured by Roundness Correlation Image Analysis, and (ii) a concavity less than 20%, wherein concavity is the percent of alumina particles based on a sample of at least 100 particles, which have a concave outer peripheral portion that extends along a distance not less than 10% of d50 by TEM inspection, the concave outer peripheral portion having a negative radius of curvature as viewed from an interior of the particle.

According to another embodiment a ceramic particulate material includes alumina particles, the particles having an average primary particle size not greater than 135 nm as measured by TEM, a secondary particle size characterized by a $d_{85}$ not less than 150 nm as measured by photon correlation spectroscopy, and a sphericity quantified by at least one of (i) a mean roundness not less than 0.710 as measured by Roundness Correlation Image Analysis, and (ii) a concavity less than 20%, wherein concavity is the percent of alumina particles based on a sample of at least 100 particles, which have a concave outer peripheral portion that extends along a distance not less than 10% of d50 by TEM inspection, the concave outer peripheral portion having a negative radius of curvature as viewed from an interior of the particle.

According to another embodiment a ceramic particulate material includes alumina particles, the particles having a specific surface area (SSA) not less than 15 $m^2/g$ and not greater than 75 $m^2/g$, an average primary particle size greater than 60 nm and less than 135 nm as measured by TEM, a secondary particle size characterized by a $d_{85}$ not less than 150 nm as measured by photon correlation spectroscopy, and a sphericity quantified by at least one of (i) a mean roundness not less than 0.710 as measured by Roundness Correlation Image Analysis, and (ii) a concavity less than 20%, wherein concavity is the percent of alumina particles based on a sample of at least 100 particles, which have a concave outer peripheral portion that extends along a distance not less than 10% of d50 by TEM inspection, the concave outer peripheral portion having a negative radius of curvature as viewed from an interior of the particle.

According another embodiment, a method for forming ceramic particulate material is provided, which includes providing a loose powder to a heat treatment chamber, the loose powder comprising particles, and hot isostatic pressing (HIPing) the loose powder. HIPing may be carried out at a pressure not less than about 0.1 ksi, wherein the particles are individually isostatically pressed to effect phase transformation of the loose powder.

Additional embodiments call for a method of forming a ceramic particulate material by combining an alumina precursor with seeds at a weight content not less than about 0.1 weight percent with respect to the combined weight of the alumina precursor and the seeds. Processing is continued with conversion of the alumina precursor into alpha-alumina particles by heat treatment. The alpha-alumina particles may have a specific surface area (SSA) not less than 15 m$^2$/g, and sphericity quantified by at least one of (i) a mean roundness not less than 0.710 as measured by Roundness Correlation Image Analysis, and (ii) a concavity less than 20%, wherein concavity is the percent of alpha alumina particles based on a sample of at least 100 particles, which have a concave outer peripheral portion that extends along a distance not less than 10% of d50 by TEM inspection, the concave outer peripheral portion having a negative radius of curvature as viewed from an interior of the particle. According to the forgoing method, the alumina precursor can advantageously be formed of boehmite. The seeds can be alpha-alumina seeds.

BRIEF DESCRIPTION OF THE DRAWINGS

The present disclosure may be better understood, and its numerous features and advantages made apparent to those skilled in the art by referencing the accompanying drawings.

DESCRIPTION OF THE EMBODIMENT(S)

Figure 1:
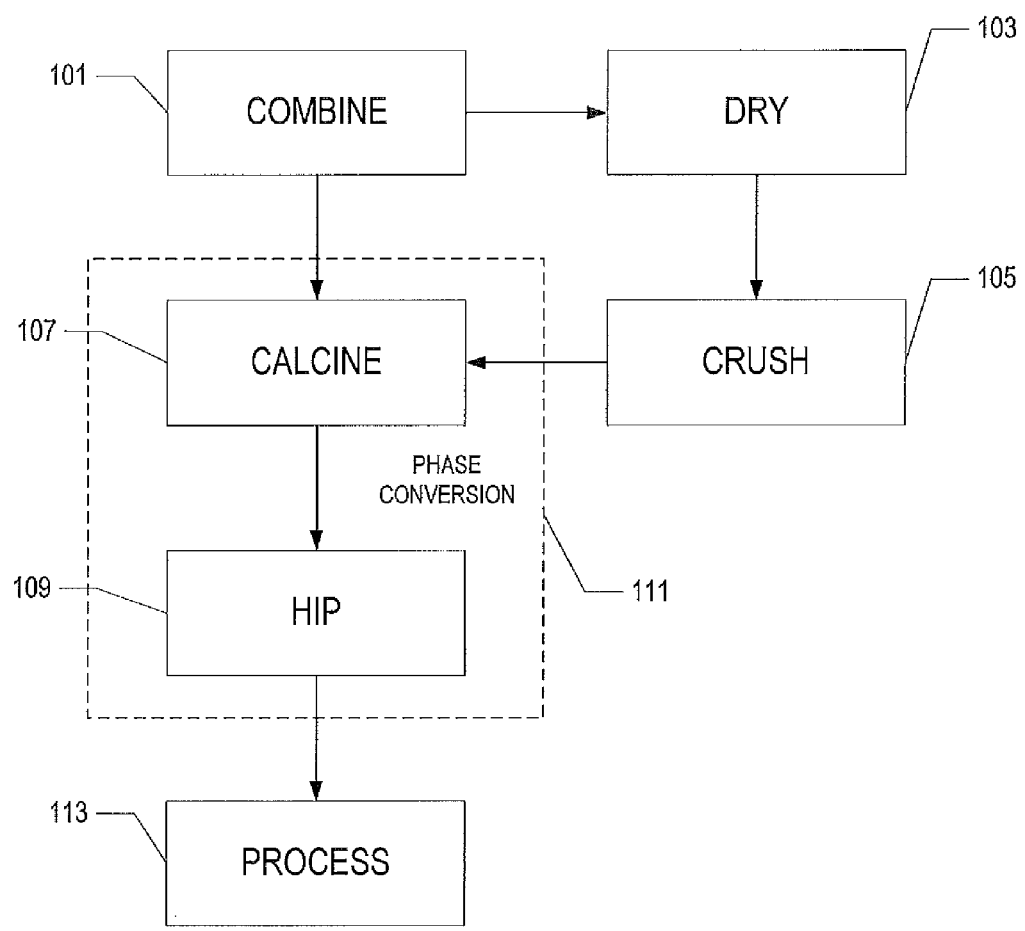
FIG. 1 is a process flow according to an embodiment.

Turning to FIG. 1, according to an embodiment, processing begins with combining a feedstock powder, generally an aluminous powder, with seeds at step 101. The feedstock powder may be formed of an alumina hydrate particulate material. In general, the alumina hydrate particulate material includes hydrated alumina conforming to the formula: $Al(OH)_aO_b$, where $0<a\leq3$ and $b=(3-a)/2$. In general, the alumina hydrate particulate material has a water content of about 1% to about 38% by weight, such as about 15% to about 38% water content by weight. By way of example, when a=0 the formula corresponds to alumina ($Al_2O_3$).

Alumina hydrate particulate materials can include aluminum hydroxides, such as ATH (aluminum tri-hydroxide), in mineral forms known commonly as gibbsite, bayerite, or bauxite, or can include alumina monohydrate, also referred to as boehmite. Such aluminum hydroxides can form alumina hydrate particulate material that is particularly useful.

In a particular embodiment, when a is approximately one (1) within the general formula: $Al(OH)_aO_b$, where $0<a\leq3$ and $b=(3-a)/2$, the alumina hydrate material corresponds to boehmite. More generally, the term "boehmite" is used herein to denote alumina hydrates including mineral boehmite, typically being $Al_2O_3 \cdot H_2O$ and having a water content on the order of 15%, as well as pseudo-boehmite, having a water content greater than 15%, such as 20% to 38% by weight. As such, the term "boehmite" will be used to denote alumina hydrates having 15% to 38% water content, such as 15% to 30% water content by weight. It is noted that boehmite (including pseudo-boehmite) has a particular and identifiable crystal structure, and accordingly, a unique X-ray diffraction pattern, and as such, is distinguished from other aluminous materials including other hydrated aluminous.

Boehmite may be obtained by processing aluminous minerals, such as an aluminous precursor through a seeded processing pathway, to provide desirable morphology and particle characteristics. Alumina hydrate particles formed through a seeded process are particularly suited for forming treated alumina hydrate agglomerates, as described below. Such seeded processing advantageously may provide desirable particle morphologies and the particles formed by such processes may be further treated without removing them from solution, such as the solution in which they were formed in situ.

Turning to the details of the processes by which the seeded aluminous particulate material may be manufactured, typically an aluminous material precursor including bauxite minerals, such as gibbsite and bayerite, are subjected to hydrothermal treatment as generally described in the commonly owned patent, U.S. Pat. No. 4,797,139 (incorporated by reference herein). More specifically, the particulate material may be formed by combining the precursor and seeds (having desired crystal phase and composition, such as boehmite seeds) in suspension, exposing the suspension (alternatively sol or slurry) to heat treatment to cause conversion of the raw material into the composition of the seeds (in this case boehmite). The seeds provide a template for crystal conversion and growth of the precursor. Heating is generally carried out in an autogenous environment, that is, in an autoclave, such that an elevated pressure is generated during processing. The pH of the suspension is generally selected from a value of less than 7 or greater than 8, and the boehmite seed material has a particle size finer than about 0.5 microns, preferably less than 100 nm, and even more preferably less than 10 nm. In the case in which the seeds are agglomerated, the seed particle size refers to seed primary particles size. Generally, the seed particles are present in an amount greater than about 1% by weight of the boehmite precursor, typically at least 2% by weight, such as 2 to 40% by weight, more typically 5 to 15% by weight (calculated as $Al_2O_3$). Precursor material is typically loaded at a percent solids content of 60% to 98%, preferably 85% to 95%.

Heating is carried out at a temperature greater than about 100° C., such as greater than about 120° C., or even greater than about 130° C. In an embodiment, the processing temperature is greater than 150° C. Usually, the processing temperature is below about 300° C., such as less than about 250°

C. Processing is generally carried out in the autoclave at an elevated pressure, such as within a range of about $1 \times 10^5$ Newtons/m$^2$ to about $8.5 \times 10^6$ Newtons/m$^2$. In one example, the pressure is autogeneously generated, typically around $2 \times 10^5$ Newtons/m$^2$.

Alternatively, the feedstock powder can be sourced from one of various commercial available sources. In this respect, various commercially available boehmite powders available from Saint-Gobain Abrasives, Inc or Sasol, Inc can be utilized.

As stated above, processing typically begins with the combination of alumina feedstock material with seeds at step 101. The seeds are advantageously a particular crystal that aids in the phase transformation of the aluminous feedstock material into the finally desired phase of the particulate material, often alpha-alumina. In this respect, the seeds can be formed principally of alpha-alumina, such as not less than about 95 weight percent alpha-alumina, or even essentially entirely alpha-alumina. The seeds are typically present in an amount not less than about 0.1 weight percent with respect to the combined weight of the alumina feedstock material and the seeds. Often times, a higher content of seeds can be utilized, such as not less than about 0.25 weight percent, not less than about 0.5 weight percent, not less than about 1.0 weight percent, not less than about 2.0 weight percent, or not less than about 3.0 weight percent. Even higher loadings can be utilized, such as not less than about 5.0 weight percent, not less than about 7.5 weight percent, or not less than 10.0 weight percent. Typically, the upper limit of the seeds is on the order of 40 weight percent, such as not less than about 30 weight percent. The seeds desirably have a fine average particle size ($d_{50}$), such as an average particle size not greater than about 200 nm, such as not greater than about 150 nm, or not greater than 100 nm. The seeds may have a particle size indeed even finer, such as not greater than about 50 nm, or even, not greater than about 40 nm.

The aluminous feedstock material generally has an average particle size $d_{50}$ not greater than about 200 nm, such as not greater than about 150 nm, such as not greater than 100 nm. Indeed particular embodiments take advantage of notably fine aluminous feedstock material, having an average particle size not greater than about 90 nm, not greater than about 75 nm, or even not greater than about 65 nm.

The combination of aluminous feedstock material and seeds may be carried out in aqueous form, such that the aluminous feedstock material and the seeds form an aqueous dispersion in the form of a sol. After a combination of the aluminous feedstock material with seeds at step 101, typically the combined material is subjected to a conversion process 111. However, prior to phase conversion at step 111, the combined material, particularly if in the form of a sol, may be subjected to a drying operation at step 103, followed by crushing and classification processing at step 105, if needed. Drying approaches can include drying in an oven within a temperature range of 50 to 100° C., for example, or by drum drying into flakes.

Phase conversion at step 111 can be composed of several substeps, including calcination at step 107 and HIPing at step 109. Calcination can be carried out in a furnace at a temperature not less than about 300° C., such as not less than about 400° C. Typically, the calcination temperature is chosen so as to cause transformation of the aluminous feedstock material into a transition form of alumina, which includes gamma, delta, and theta phases. Accordingly, high temperatures on the order of 950° C. and above are typically not employed for the calcination process, to prevent partial or whole conversion into the high temperature form of alumina, alpha-alumina. Typical calcination time periods are generally greater than about 15 minutes, such as not less than about 0.5 hours, or not less than about 1.0 hours.

After calcination at step 107, the resulting material is desirably in the form of a transition phase alumina as stated above, and forms a loose powder. Optionally, a light milling or mechanical agitation may be carried out to break-up any weakly bonded aggregates as a result of the calcination step, to provide a loose powder composed principally of individual particles. Processing within the phase conversion step 111 may continue with HIPing at step 109. Unlike conventional HIPing, according to a particular aspect of an embodiment, HIPing is carried out in connection with loose powder. State of the art HIPing technologies typically utilize HIPing to form high density ceramic bodies, by one of several pathways. For example, a green or partially sintered ceramic body (precursor component) can be encapsulated in a gas and/or liquid impermeable membrane referred to a "can" in the art. The encapsulated precursor component is then subjected to high temperature and high pressure processing to effect the formation of a high density ceramic. Alternatively, HIPing utilizes a two step process, in which a ceramic green body is subjected to a sintering process in order to convert the green body into a ceramic body with entirely closed porosity. The thus sintered green body having closed porosity is then subjected to high temperature, high pressure treatment (HIPing) in a fluid (liquid or gaseous) medium to complete the conversion of the body into a desirably high density body, often times on the order of 99% of theoretical density and above.

In contrast, HIPing 109 is generally carried out in connection with a loose powder, as opposed to a ceramic body that is subjected to a canning operation or a pre-sintering operation. By subjecting loose powder to HIPing, the individual particles experience isostatic pressing. The HIPing operation at step 109 desirably adds energy into the conversion process. Accordingly, conversion of the transition alumina formed by calcining at step 107 into alpha-alumina can advantageously be carried out at comparatively low temperatures. For example, HIPing can be carried out at a temperature not less than about 300° C., such as a temperature not less than about 400° C., not less than about 450° C., or not less than about 500° C. Temperatures can be set somewhat higher, such as not less than 600° C., not less than 700° C., or not less than 800° C. Generally, the HIPing temperatures are notably lower than those utilized in atmospheric pressure phase transformation processes, which are often times on the order of 1100° C. and above, such as on the order of 1200° C. The addition of pressure, in addition to thermal energy, permits phase transformation into alpha-alumina at temperatures generally at least about 50° C., or even at least about 100° C., or even 150° C. less than the temperature required for the same phase transformation at atmospheric pressure.

Generally, HIPing pressures are not less than about 0.1 ksi, such as not less than about 0.25 ksi, not less than about 0.5 ksi, or not less than about 1.0 ksi. Higher pressures may be utilized to assist in phase transformation, further reducing required processing temperature, such as not less than about 2.0 ksi, not less than about 3.0 ksi, or even not less than about 5.0 ksi. Even higher pressures can be utilized for certain processes, which may result in even higher density particulate materials, such as not less than about 10 ksi, or even not less than about 20 or 25 ksi.

While the forgoing description has been made in connection with a sequential process flow in which calcination at step 107 is carried out to form a transition phase alumina prior to HIPing, the calcination step may alternatively be skipped, with the combined alumina feedstock material and seeds proceeding directly to HIPing treatment. However, particularly desirable alpha-alumina particulate materials have been achieved through the sequential processing noted above.

Following cool down from the HIPing process, the resulting phase transformed particulate material may be processed. It has been discovered that post-HIPing, the resulting phase transformed powder has desirably low necking between individual particles, which may be easily broken down through a light milling step, carried out by ball milling, attrition milling, or jet milling, for example. Alternative or additional processing at step 113 may include particulate sorting. In addition, processing can include redispersion of the particulate material into an aqueous or non-aqueous medium. Such dispersion can be particularly desirable in the context of polishing applications, in which a slurry is utilized for polishing or CMP applications.

Following phase transformation into alpha-alumina particulate material and any post conversion processing desired, characterization studies of the particulate material reveal particular morphological and other characteristics. Of particular note, the ceramic particulate material has a notable sphericity quantified by at least one of mean roundness and concavity. Mean roundness may be characterized by Roundness Correlation Image Analysis. According to one embodiment, mean roundness is not less than about 0.710, such as not less than about 0.720, or not less than about 0.730. Indeed, particular embodiments have been found to have a mean roundness not less than 0.740.

Alternatively or additionally, sphericity may be characterized by concavity. As used herein "concavity" is the percent of alumina particles based on a sample of at least 100 particles, which have a concave outer peripheral portion that extends along a distance not less than 10% of d50 of the particulate material, as ascertained by TEM (transmission electron microscopy). Notably, the concave outer peripheral portion has a negative radius of curvature as viewed from an interior of the particle. Indeed, particular embodiments of the ceramic particulate material have been found to have a concavity less than 15%, such as less than 10%, or even not less than 5%. Indeed, embodiments have been measured to have a concavity not greater than 3%, such as not greater than 2%.

Further, the alumina particles forming the ceramic particulate material may have a specific surface area (SSA), as measured by BET analysis. In particular, the SSA measurements herein were done by degassing and drying at 250° C. for 0.5 hours, followed by nitrogen single point BET on a Quantichrome Quantisorb apparatus, model year 1983.

According to embodiments herein, the SSA is generally not less than about 15 $m^2/g$. Generally, the upper limit of the SSA is not greater than about 75 $m^2/g$, such as not greater than about 60 $m^2/g$, not greater than about 50 $m^2/g$, or not greater than 40 $m^2/g$. Further, the SSA may have a particularly confined SSA, such as not greater than about 30 $M^2/g$.

It is further noted that the alumina particles forming the ceramic particulate material generally are comprised of alpha-phase alumina, as already mentioned above. The alumina particulate materials may consist essentially of alpha-phase alumina. Particular embodiments are formed principally of alpha-phase alumina, such as at least about 85 wt %, at least about 90 wt %, at least about 95 wt % alpha phase alumina or even essentially entirely alpha-phase alumina, ignoring minor non-alpha phase alumina species, such as trace impurities. The alpha phase particles forming the ceramic particulate material may also desirably be formed of a single crystal. That is, spectroscopy analysis has revealed that the individual particles may be formed of single crystal alpha alumina, which may be desirable for particular applications.

Still further, the alumina particles have been characterized in terms of primary particle size and secondary particle size. According to TEM analysis, embodiments have been found to have a primary particle size greater than about 60 nm. Certain embodiments may have limited primary particle size, such as not greater than about 135 nm, or not greater than 125 nm. Still further, the average primary particle size may be not greater than about 110 nm, such as not greater than about 100 nm. Still further, embodiments of the present invention provide notably fine particulate material, having an average size not greater than about 90 nm, such as not greater than about 80 nm, 70 nm or even not greater than 60 nm.

The secondary particle size is characterized herein by photon correlation spectroscopy. Embodiments have shown a secondary particle size characterized by a $d_{85}$ not less than about 150 nm, such as not less than 155 nm. Embodiments have shown somewhat larger $d_{85}$ values, such as not less than about 170, or not less than about 180 nm. Secondary particle size may be further characterized by a $D_{50}$, a common measurement of secondary particle size. According to embodiments, the $D_{50}$ can be not greater than about 135 nm, such as not greater than about 120 nm, or not greater than 100 nm.

EXAMPLES

Example 1

Example 1 illustrates the effect of temperature and pressure on conversion of seeded aluminous feedstock in the form of boehmite. Example 1 begins with the formation of an alumina sol prepared by mixing 100 grams of Disperal boehmite from Sasol Corporation into 700 ml of water with 5% alpha-alumina seeds, having a crystal size of 0.02 microns, generated by horizontal bead milling of 0.5 micron alpha-alumina and 3% of nitric acid relative to boehmite. The sample was then placed into a drying oven at 80° C. overnight. Drum drying into flakes may alternatively be utilized. The dried material was calcined into a box furnace at 500° C. for two hours, to form transition phase alumina, forming an open structure, that is, a loose particulate material having limited inter particle necking. The material was then subjected to HIPing treatment to obtain alpha-alumina powder. Table 1 below shows the effect of temperature and pressure combinations on the phase transformation of the loose powder provided in the HIPing environment. Alpha alumina content sample was characterized by XRD, under the following conditions: voltage 45 kV, current 40 mA, philips 0.2 step size, 1 second hold, 5-80° two-theta.

TABLE 1

| sample | Temperature (° C.) for 1 hr | Pressure (ksi) | Density (g/cc) | Alpha content by XRD |
|---|---|---|---|---|
| 1 | 975 | 30 | 3.97 | 100% |
| 2 | 975 | 10 | 3.96 | 100% |
| 3 | 950 | 10 | 3.97 | 100% |
| 4 | 950 | 5 | 3.93 | 100% |
| 5 | 925 | 5 | 3.95 | 100% |
| 6 | 925 | 2.5 | 3.95 | 100% |
| 7 | 900 | 5 | 3.94 | 100% |
| 8 | 900 | 2.5 | 3.94 | 100% |
| 9 | 900 | 1 | 3.93 | 100% |
| 10 | 900 | 0.5 | 3.94 | 100% |
| 11 | 900 | 30 | 3.97 | 100% |

TABLE 1-continued

| sample | Temperature (° C.) for 1 hr | Pressure (ksi) | Density (g/cc) | Alpha content by XRD |
|---|---|---|---|---|
| 12 | 750 | 3.5 | 3.95 | 100% |
| 13 | 750 | 2.5 | 3.95 | 100% |
| 14 | 600 | 5 | 3.57 | 42.9% |
| 15 | 500 | 30 | 3.66 | 64.3% |
| 16 | 500 | 6 | 3.47 | 13.3% |
| 17 | 975 | Ambient | | 86.4% |
| 18 | 600 | Ambient | | 4.2% |
| 19 | 1040 | Ambient | 3.94 | 100% |

Figure 2:
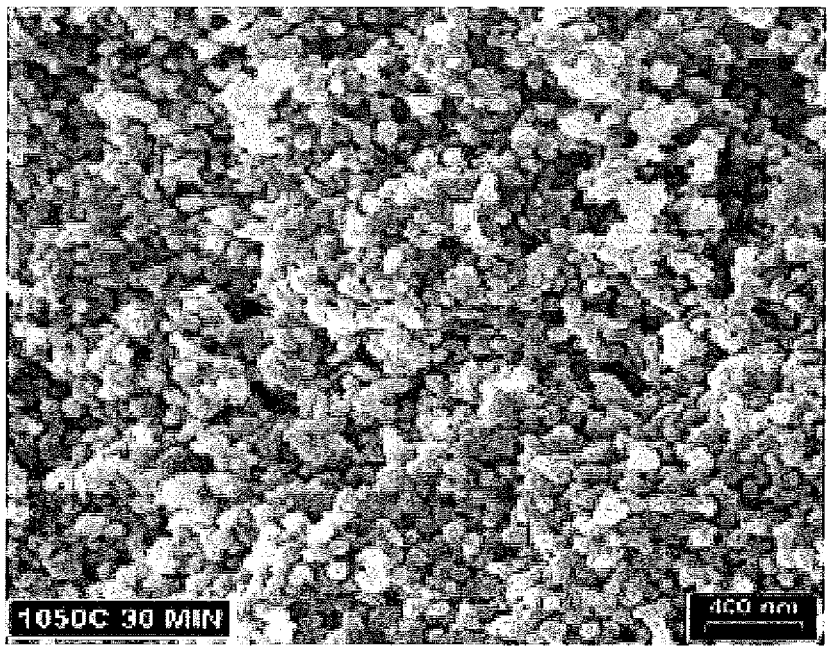
FIGS. 2 and 3 are SEM photographs of sintered alpha alumina particulate material according to an comparative example.
Figure 3:
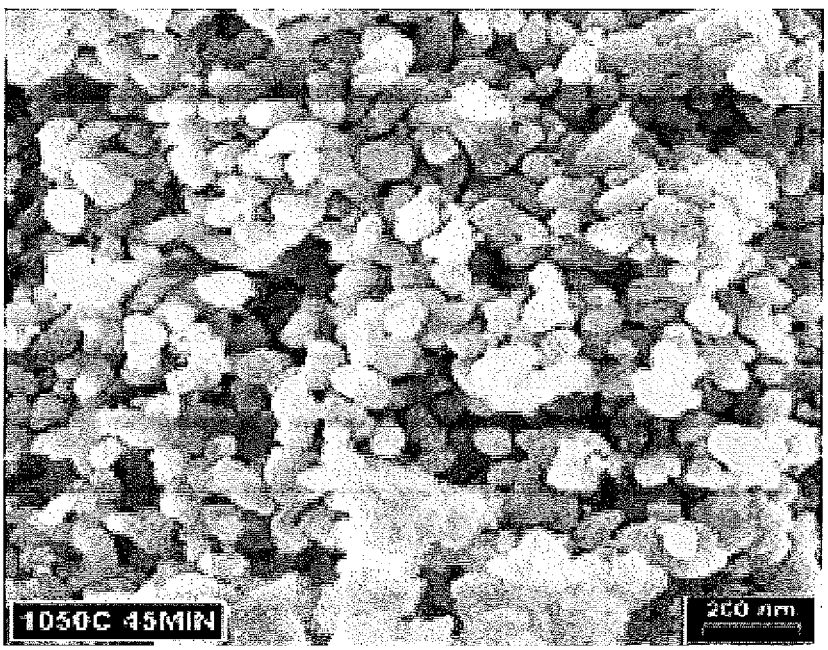
Figure 4:
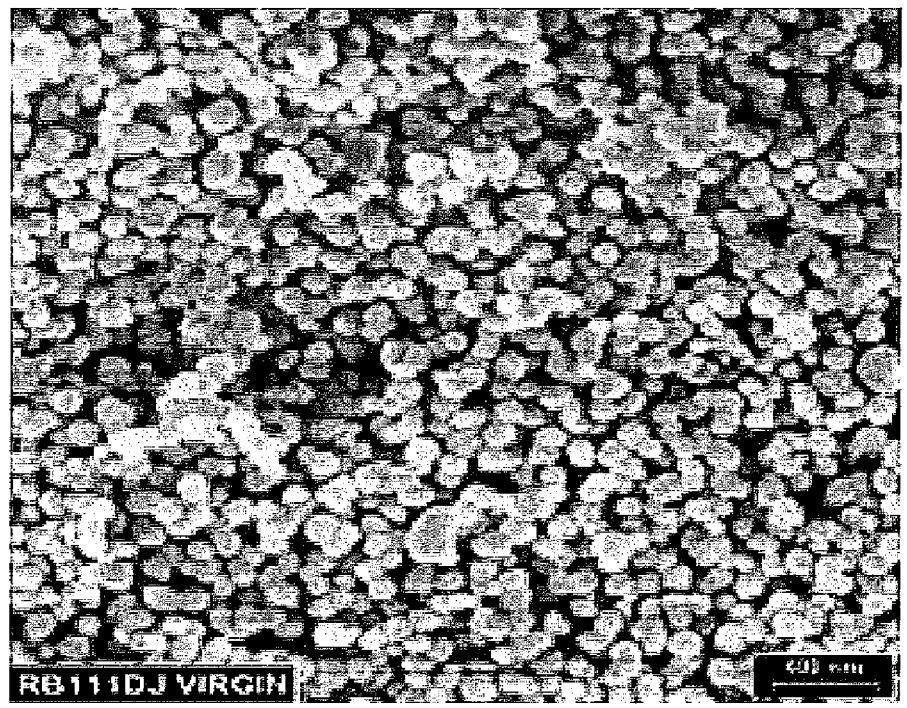
FIGS. 4 and 5 illustrate alpha-alumina powder subjected to HIPing after calcination, according to an embodiment.
Figure 5:
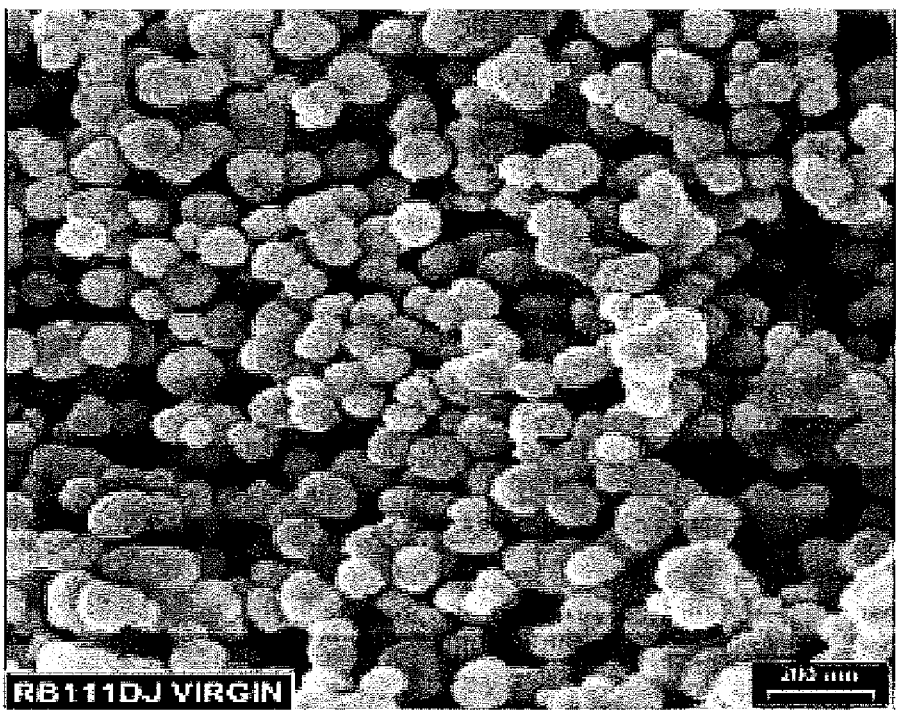
Figure 6:
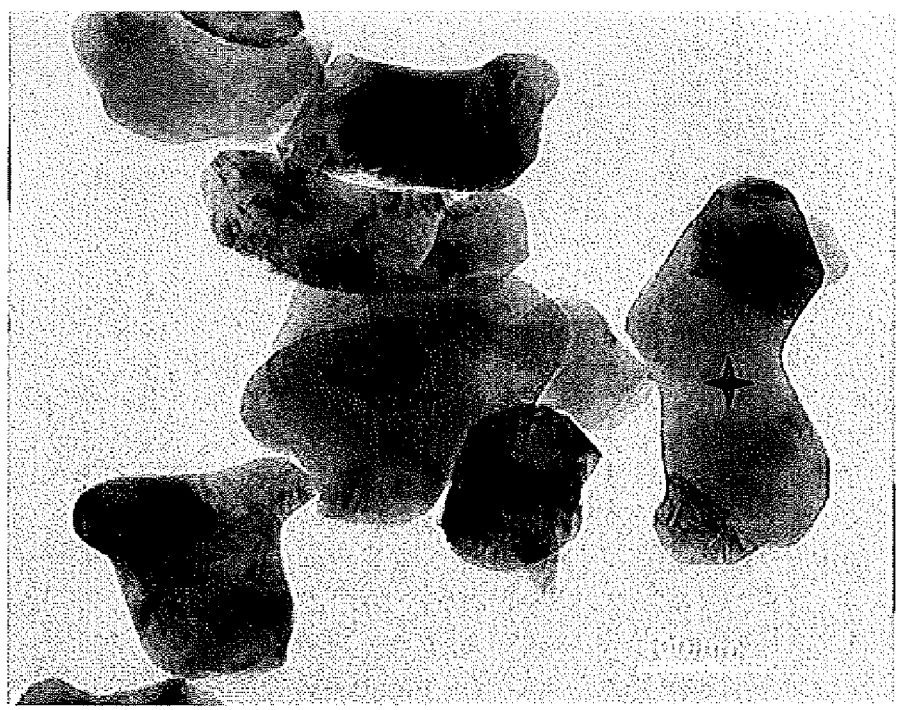
FIGS. 6-11 are TEM images of a commercially available nanoalumina powder from Taimicron.
Figure 7:
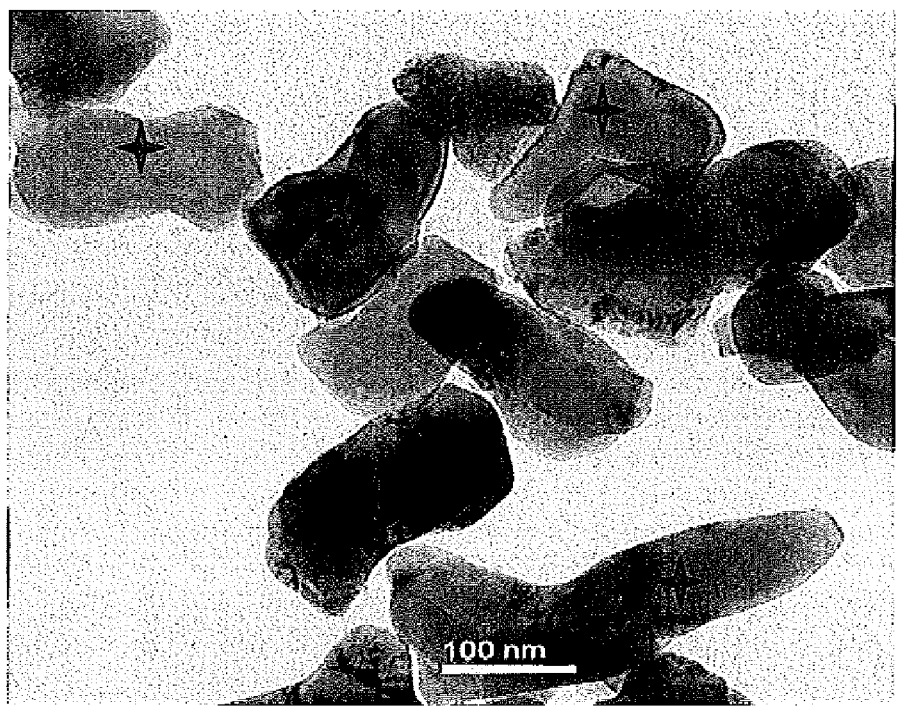
Figure 8:
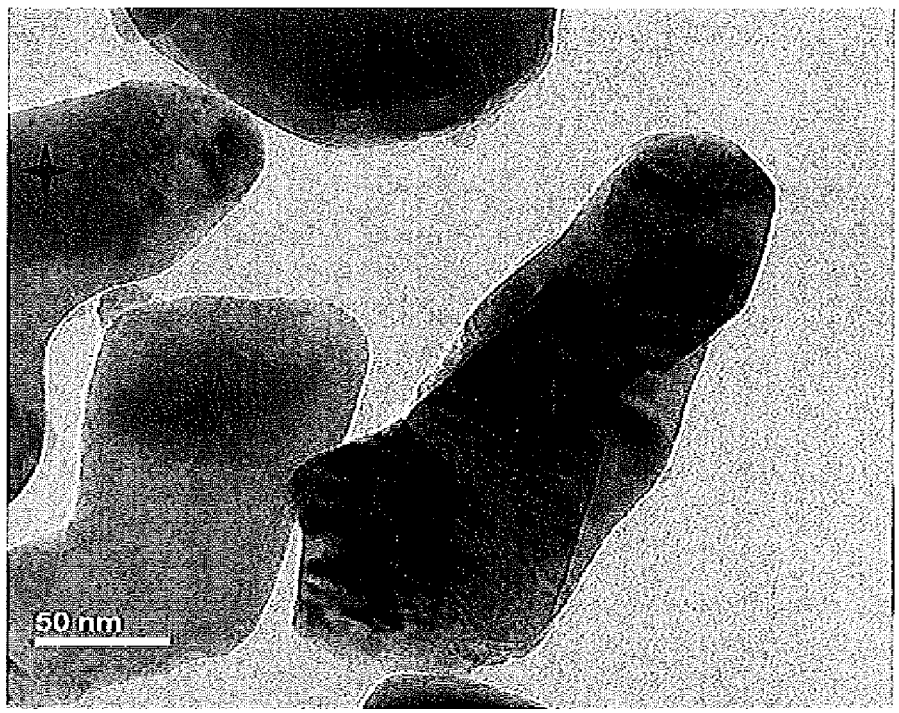
Figure 9:
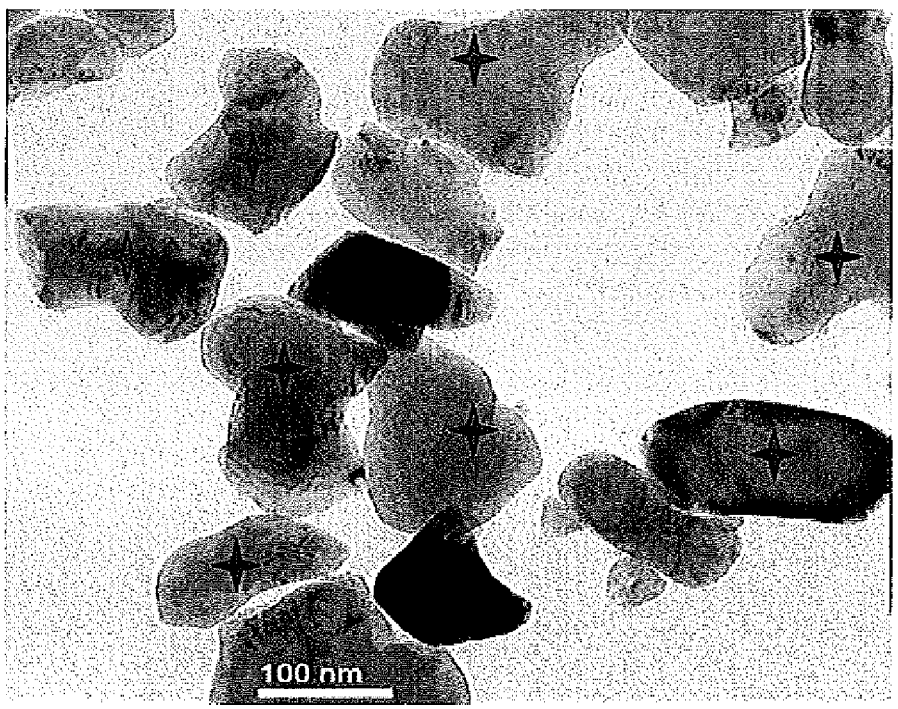
Figure 10:
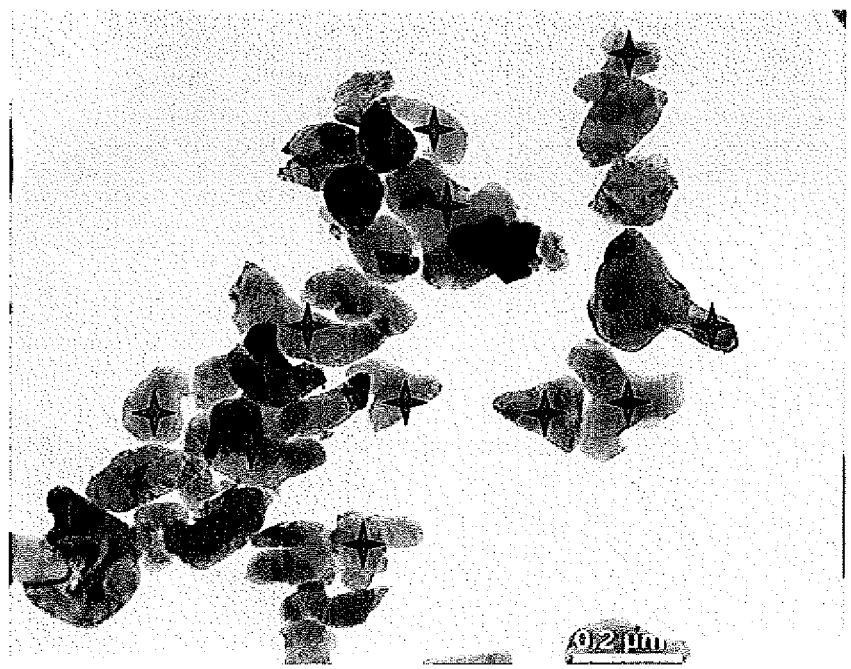
Figure 11:
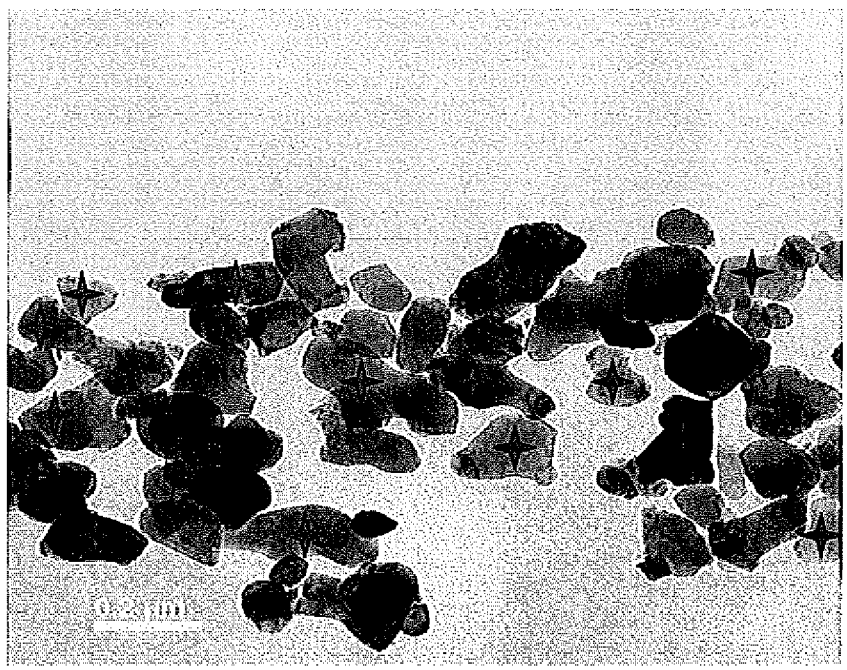
Figure 12:
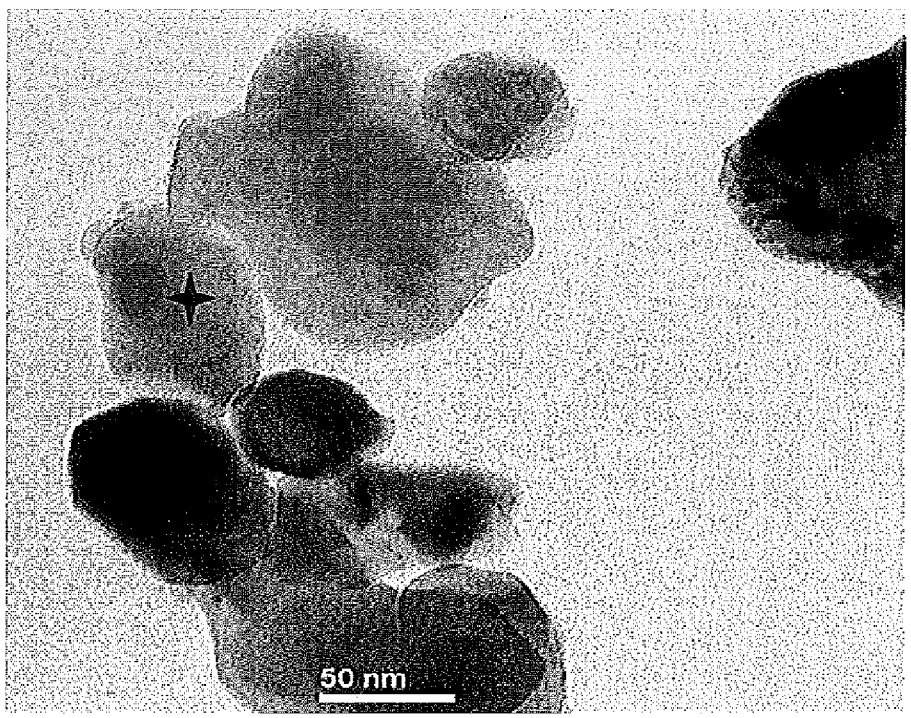
FIGS. 12-15 are TEM images of a commercially available nanoalumina powder available from Sumitomo.
Figure 13:
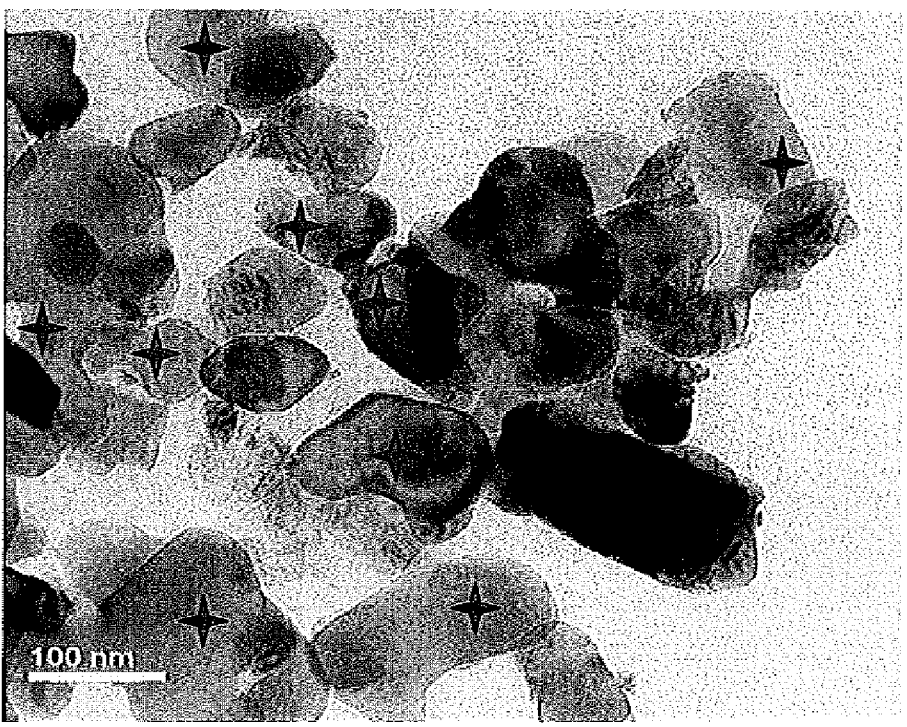
Figure 14:
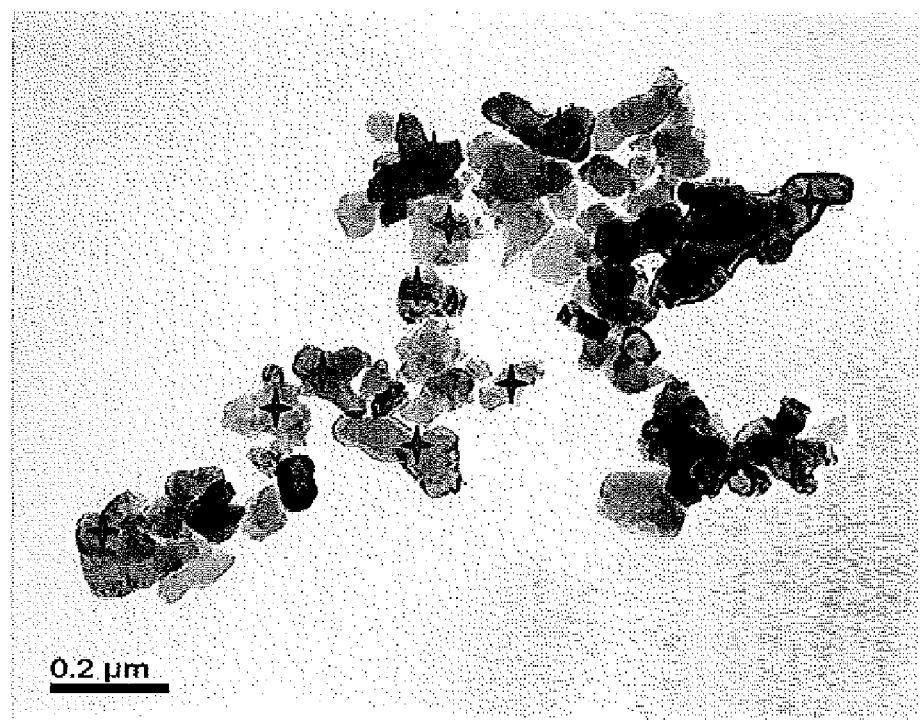
Figure 15:
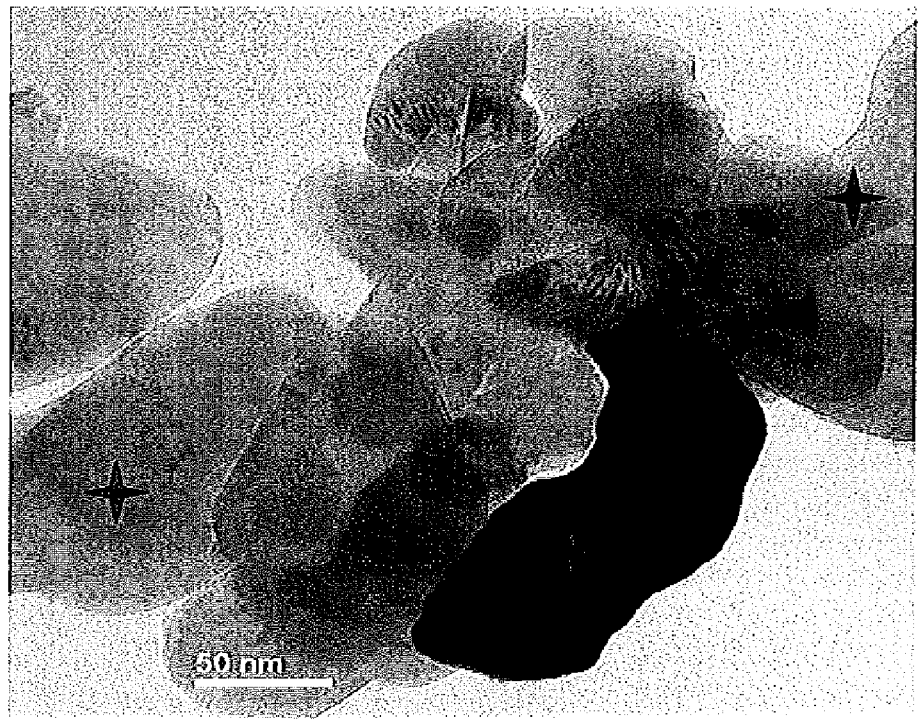
Figure 16:
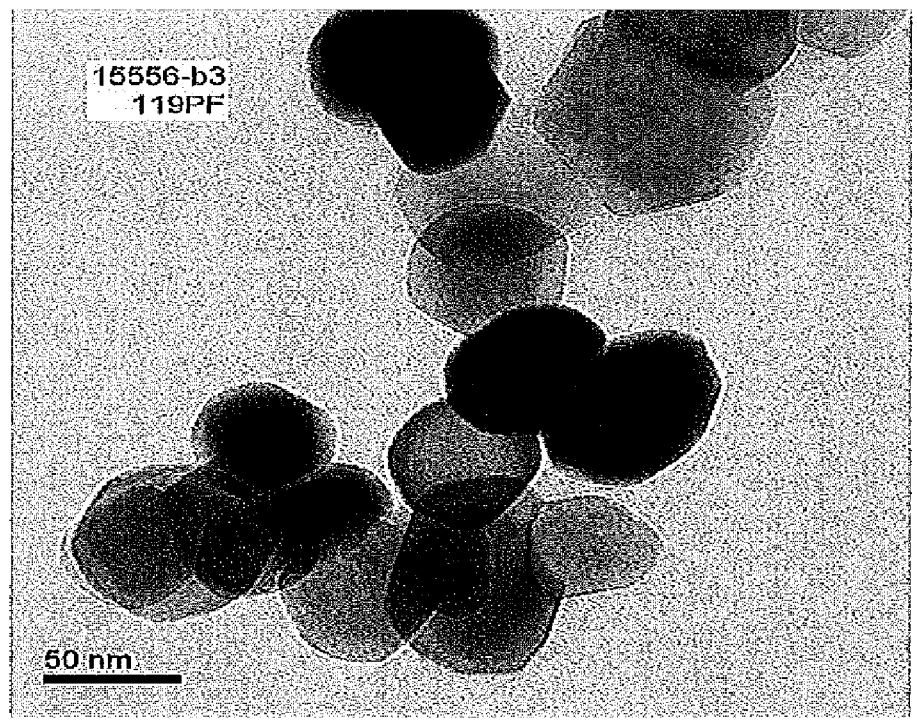
FIGS. 16-25 are TEM images of a ceramic particulate material according to an embodiment of the present invention.
Figure 17:
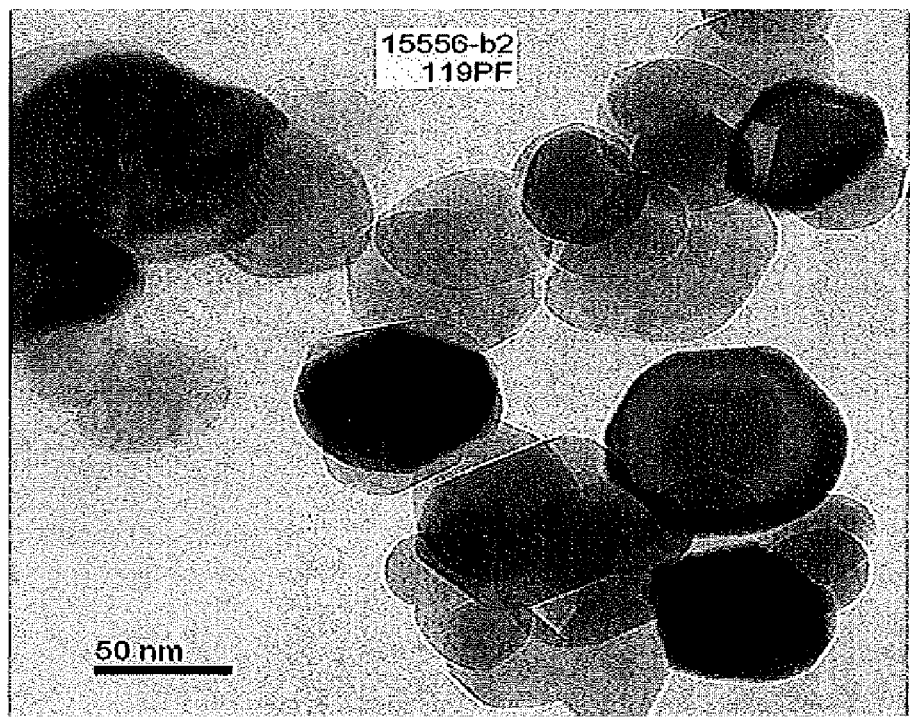
Figure 18:
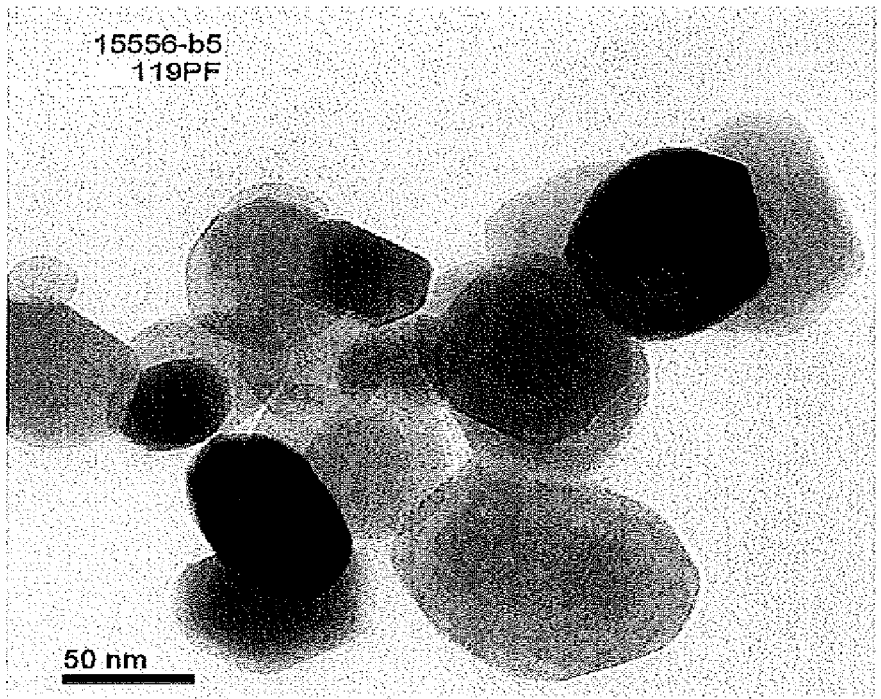
Figure 19:
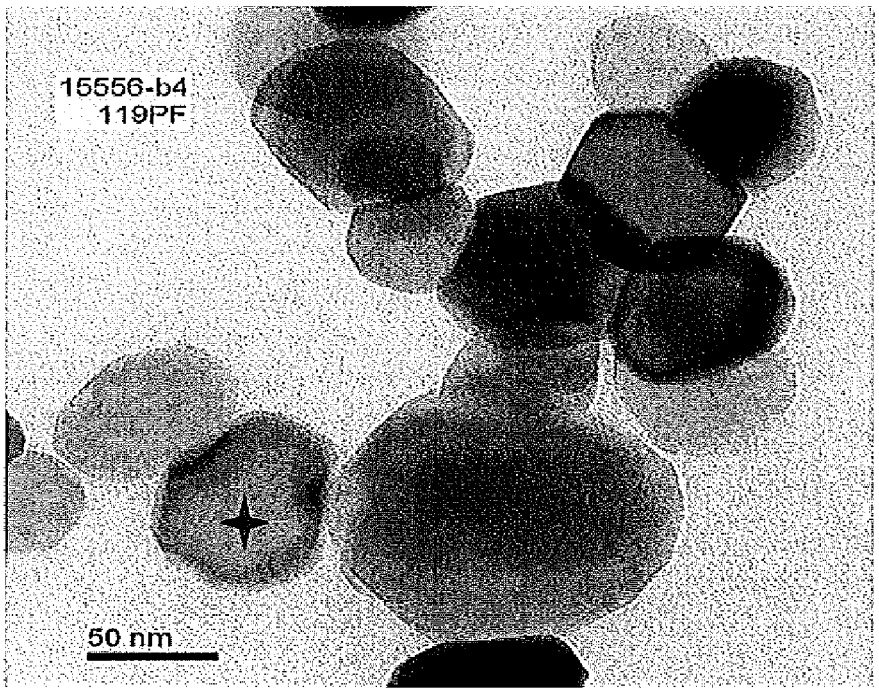
Figure 20:
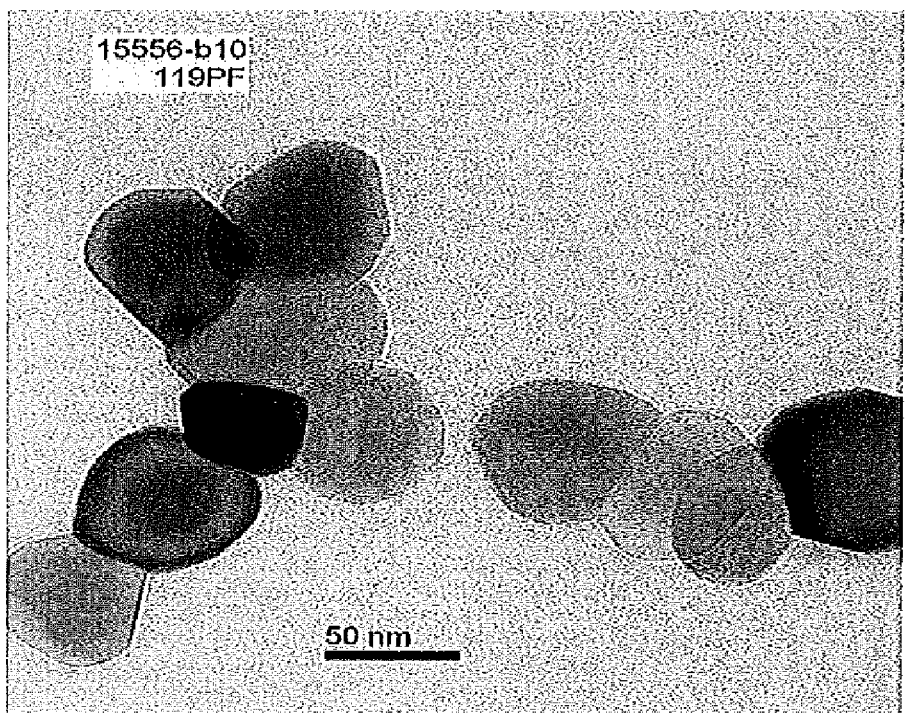
Figure 21:
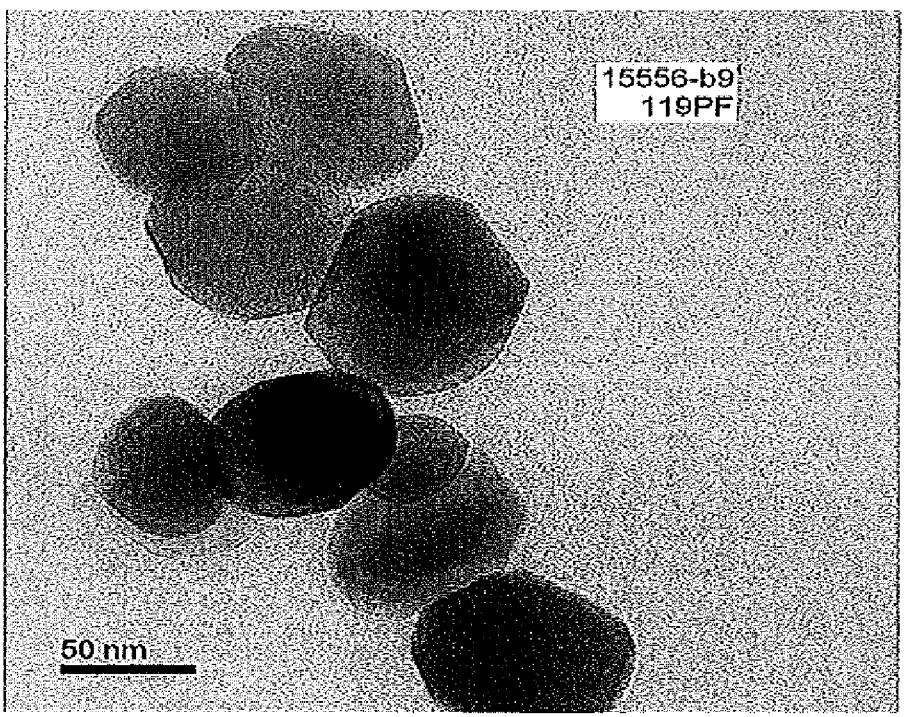
Figure 22:
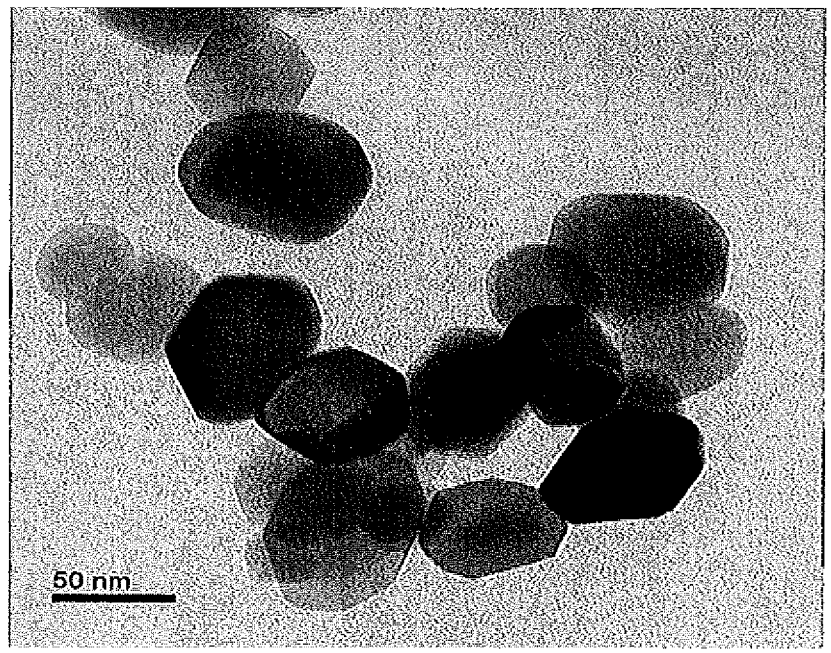
Figure 23:
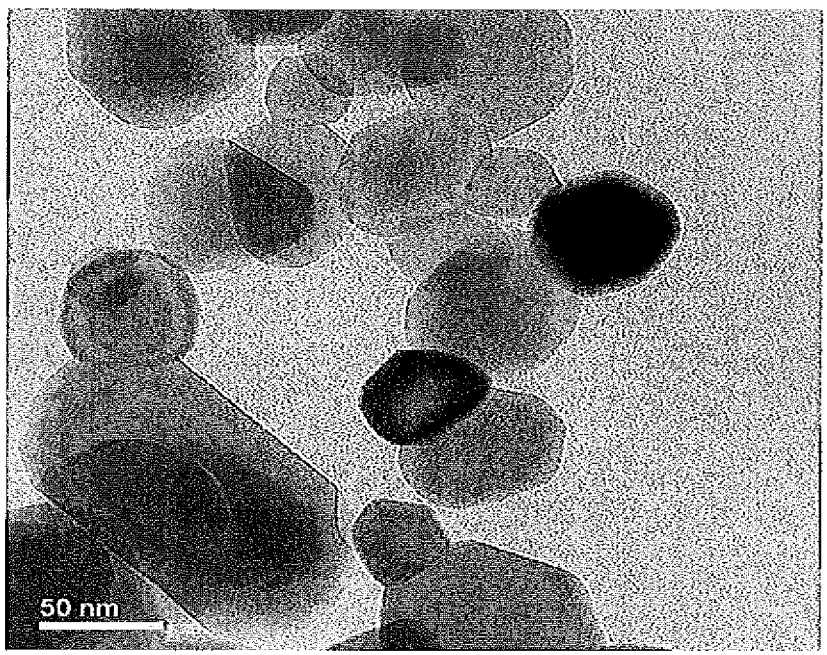
Figure 24:
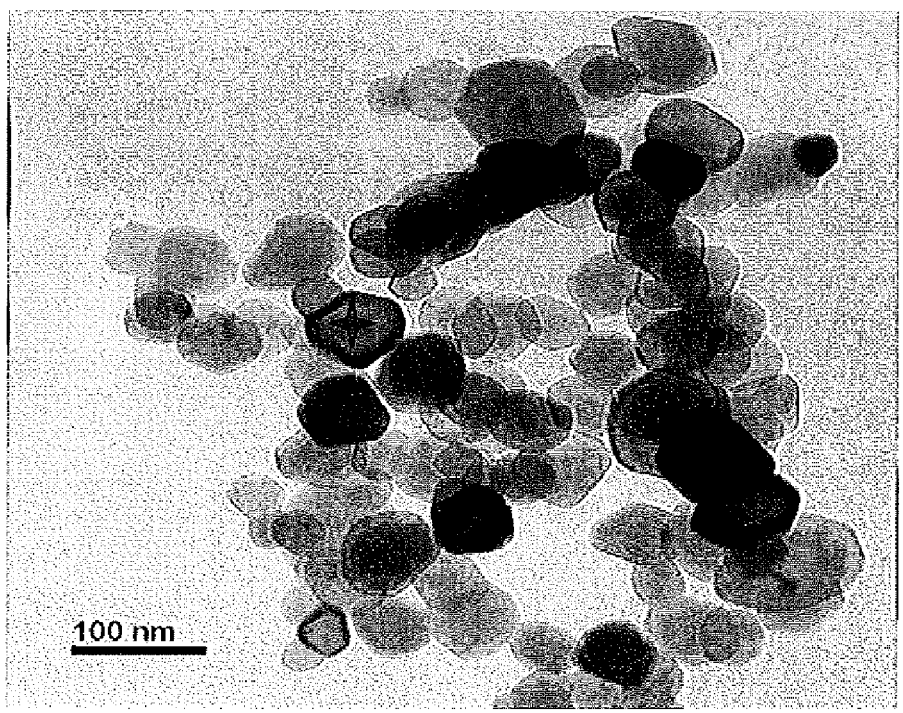
Figure 25:
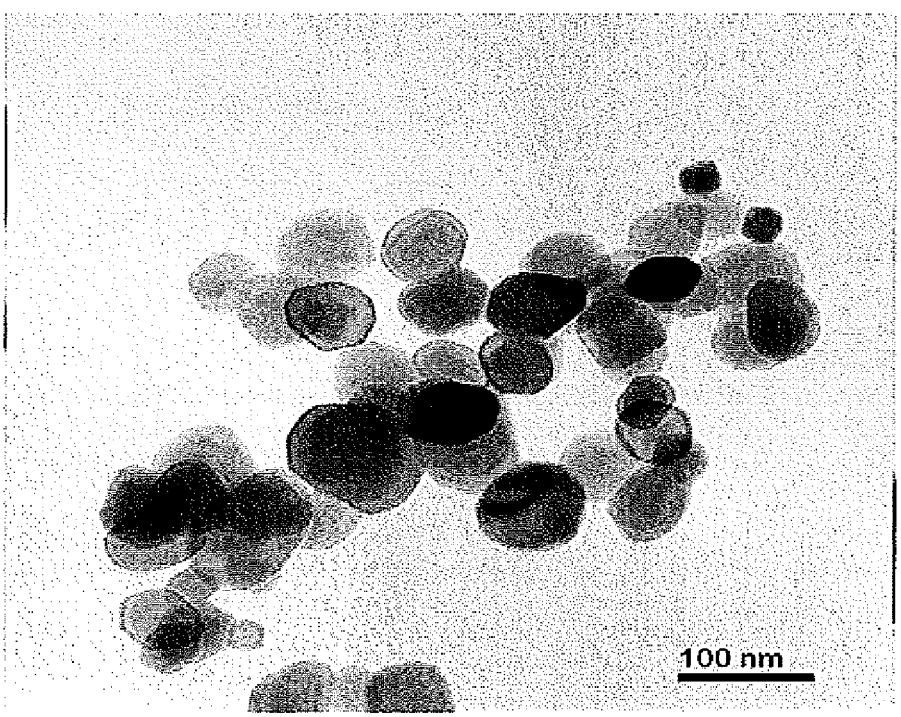

A comparison between sample 9 and comparative sample 19, in which the same seeded boehmite feedstock material is subjected to phase conversion under ambient conditions (sample 19) versus pressure assisted conditions via HIPing (sample 9). FIGS. 2 and 3 are SEM micrographs of comparative sample 19 showing a phase transformed sample carried out at ambient conditions, sintering at 1050° C. In contrast, FIGS. 4 and 5 illustrate an SEM image of sample 9 formed at a comparatively lower temperature of 900° C. with a pressure assist at 1 ksi. A comparison of FIGS. 2 and 3 with FIGS. 4 and 5 show that transformation under ambient conditions leads to partially necked particles that are difficult to mill, and which have characteristic morphological features due to aggressive milling. The HIPing process utilizing a pressure assist conserves the very open structure and minimizes necking in the phase converted powder, and is easily millable and generally maintains the as-processed individual particle morphology post-milling.

Example 2

Further characterization studies on powder particulate sphericity were also carried out. As noted above, sphericity may be characterized in terms of concavity; concavity being the percent of particles based upon a sample of at least 100 particles, which have a concave outer peripheral portion that extends along a distance not less than 10% of $d_{50}$ of the particulate material by TEM inspection, the concave outer peripheral portion having a negative radius of curvature as viewed from an interior of the particle. In this respect, a state of the art nanosized alpha-alumina powder is depicted in FIGS. 6-11 from Taimicron. Those particles marked represent particles that have the requisite concavity to be considered a concave particle. Based upon the sample analysis depicted in FIGS. 6-11, the Taimicron powder was found to have a concavity of 39.2%. A second state of the art powder from Sumitomo (commercially available as AKP700) is shown in TEM images corresponding to FIGS. 12-15. The Sumitomo powder was found to have a concavity of 25.5%. It is believed that this particular sample corresponds to the state of the art nitrate salt based processing, as described in U.S. Pat. No. 7,078,010.

In direct contrast with the state of the art nanosized alumina powders describe above, FIGS. 16-25 are TEM images depicting an embodiment herein, showing notably spherical particles. The particulate material according to the illustrated embodiment was found to have a concavity of 1.2%.

Example 3

Figure 26:
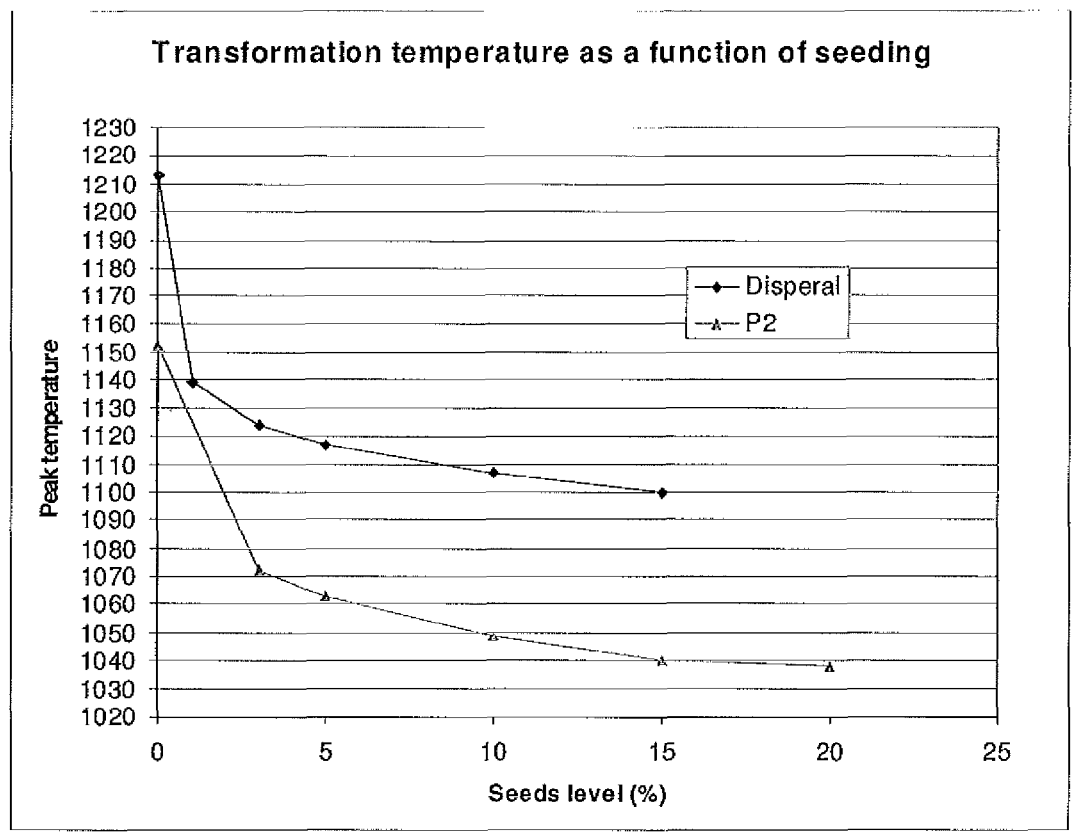
FIG. 26 illustrates the effect of transformation temperature based on seeding level according to an embodiment.

Example 3 illustrates the effect of seeding on the minimum transformation temperature required to transform seeded boehmite to alpha-alumina. A first alumina gel was prepared by mixing 100 grams of Disperal boehmite ($d_{50}$=0.08 microns) into 700 ml of water and 3% of nitric acid relative to boehmite. A second gel was prepared with the same proportion but using a finer boehmite designated P2 ($d_{50}$=0.05 microns). The seeding levels (wt %) as a function of peak temperature (° C.) required to convert the seeded boehmite into the alpha phase is shown in FIG. 26, where alpha transformation was determined using DTA analysis. FIG. 26 shows that the finer dispersion corresponding to the P2 alpha-alumina precursor achieves a transformation from boehmite to alpha-alumina at comparatively lower temperatures than that of the sample containing Disperal.

Example 4

Example 4 was carried out to show the effect of the temperature/pressure combination on the phase transformation of the particulate material. Here, an alumina gel was prepared by mixing 100 grams of P2 boehmite as utilized above from Sasol into 700 ml of water with 10% of alpha-aluminous seeds having a crystal size of 0.02 microns, with 3% of nitric acid relative to the boehmite. The sample was then placed into a drying oven at 80° C. overnight. The dried material was calcined in a box furnace at 500° C. for two hours to transform the material into transition alumina having a very open structure with limited necking. Finally the material was processed at various temperatures and isostatic pressure conditions.

The following Table 2 shows the effect of the temperature/pressure combination on phase transformation described by specific surface area and density of the final product.

TABLE 2

| sample | Temperature (° C.) | Pressure (ksi) | SSA (m²/g) | Density (g/cc) |
|---|---|---|---|---|
| 1 | 750 | 1 | 18.1 | 3.93 |
| 2 | 750 | 1 | 17.7 | 3.93 |
| 3 | 700 | 1 | 18.5 | 3.93 |
| 4 | 650 | 1 | 21.8 | 3.93 |
| 5 | 600 | 1 | 22.2 | 3.92 |
| 6 | 550 | 2.5 | 33.1 | 3.90 |

Example 5

Several samples 1-4 and comparative samples according to Example 5 were characterized to measure mean roundness relative to the state to the art powder, summarized in Table 3 below. Mean roundness was measured by Roundness Correlation Image Analysis, and is measured according to the formula 4*pi*AREA/((PERIMETER)^0.5). As the Perimeter of the object increases in circular proportion to its AREA, the value is stationary around 1.0, if the Perimeter increases more rapidly than the Area, e.g. for irregular objects, the value decreases. Particularly, mean roundness was generated using SimplePCI version 5.3.1.091305 from Compix Inc. Sample images acquired by TEM elsewhere were imported, one at a time, into the software. The software was calibrated according to the micron bar on the TEM image. As each image is opened from within the program, SimplePCI records other information about the image, most importantly the width and height dimensions of the image in pixels. This information is used by the software to quantify mean roundness according to the above formula.

There are normally several images provided per sample. In the "edit" menu, a freehand line drawing tool is used to "outline" or draw a shape consistent with the perimeter of each particle. Only particles that fit entirely within the confines of the image are used. Because of the nature of a TEM image, particles may sometimes appear to "overlap". In these cases, only particles that can be viewed in their entirety and that do not touch another particle are considered for measurement.

After an outline has been drawn around particles that meet the above criteria, a software command "fill holes" is used, which makes a solid shape of the area within the border drawn around the particles. Then, measurement can be carried out. The software offers a menu of measurement parameters.

TABLE 3

| sample | Mean roundness |
|---|---|
| 1 | 0.742 |
| 2 | 0.732 |
| 3 | 0.744 |
| 4 | 0.751 |
| Taimicron-DAR | 0.644 |
| Sumitomo AKP700 | 0.699 |

As should be apparent by the foregoing embodiments, alumina particulate material is provided that has distinct morphology, such as in terms of roundness, concavity, specific surface area, and primary and secondary particle sizes, for example, as well as composition, including elevated alpha alumina levels. In this respect, further information was gathered on the particulate material described in U.S. Pat. No. 6,841,497. That particulate material is characterized by notably low proportions of alpha alumina content in connection with sub 60 nm particles. It is believe that such fine particles contain, at most, 80 wt % alpha alumina. In addition, such low percentages of alpha alumina result in reduced roundness and increased concavity, as observed by TEM analysis.

While the invention has been illustrated and described in the context of specific embodiments, it is not intended to be limited to the details shown, since various modifications and substitutions may be made without departing in any way from the scope of the present invention. For example, additional or equivalent substitutes may be provided and additional or equivalent production steps may be employed. As such, further modifications and equivalents of the invention herein disclosed may occur to persons skilled in the art using no more than routine experimentation, and all such modifications and equivalents are believed to be within the scope of the invention as defined by the following claims.

The invention claimed is:

1. A method for forming ceramic particulate material, comprising:
   combining particles comprising aluminous feedstock and seeds to form a loose powder;
   providing the loose powder into a heat treatment chamber; and
   hot isostatic pressing (HIPing) the loose powder at a pressure not less than about 0.1 ksi, wherein the particles are individually isostatically pressed to effect phase transformation of the loose powder.

2. The method of claim 1, wherein the loose powder comprises aluminous particles.

3. The method of claim 2, wherein the aluminous particles are comprised of non-alpha alumina.

4. The method of claim 3, wherein the aluminous particles are comprised of hydrated alumina.

5. The method of claim 4, wherein the aluminous particles are comprised of boehmite.

6. The method of claim 3, wherein the aluminous particles are comprised of transition alumina.

7. The method of claim 1, wherein HIPing is carried out at a temperature not less than 300° C.

8. The method of claim 7, wherein HIPing is carried out at a temperature not less than 400° C.

9. The method of claim 8, wherein HIPing is carried out at a temperature not less than 450° C.

10. The method of claim 1, wherein HIPing is carried out at a pressure not less than 0.25 ksi.

11. The method of claim 10, wherein HIPing is carried out at a pressure not less than 0.5 ksi.

12. The method of claim 11, wherein HIPing is carried out at a pressure not less than 1.0 ksi.

13. The method of claim 12, wherein HIPing is carried out at a pressure not less than 2.0 ksi.

14. The method of claim 1, further comprising wherein forming the loose powder comprises combining aluminous feedstock with seeds at a seed loading level of not less than 0.1 wt % relative to the combined weight of the aluminous feedstock and the seeds, and calcining the combined hydrated alumina and seeds to convert the aluminous feedstock into loose powder comprised of transition alumina.

15. The method of claim 14, wherein the seeds are comprised of alpha-alumina.

16. The method of claim 14, wherein the aluminous feedstock comprises hydrated alumina.

17. The method of claim 16, wherein the aluminous feedstock comprises boehmite.

18. The method of claim 14, wherein the seeds are present in an amount not less than 0.25 wt %.

19. The method of claim 14, wherein the seeds have an average primary particle size not greater than 200 nm.

20. The method of claim 19, wherein the seeds have a average primary particle size not greater than 100 nm.

21. The method of claim 20, wherein the seeds have a average primary particle size not greater than 50 nm.

22. The method of claim 21, wherein the aluminous feedstock has an average particle size $d_{50}$ not greater than 200 nm.

23. The method of claim 22, wherein the aluminous feedstock has an average particle size $d_{50}$ not greater than 150 nm.

24. The method of claim 23, wherein the aluminous feedstock has an average particle size $d_{50}$ not greater than 100 nm.

25. A method for forming a ceramic particulate material, comprising:
   combining alumina precursor with alpha-alumina seeds, the alpha alumina seeds being present in an amount not less than 0.1 wt % with respect to the combined weight of the alumina precursor and the alpha-alumina seeds;
   converting the alumina precursor into alpha alumina particles by heat treatment, wherein the heat treatment comprises hot isostatic pressing (HIPing),
   wherein the alpha alumina particles have a specific surface area (SSA) not less than 15 m²/g, and sphericity quantified by at least one of (i) a mean roundness not less than 0.710 as measured by Roundness Correlation Image Analysis, and (ii) a concavity less than 20%, wherein concavity is the percent of alpha alumina particles based on a sample of at least 100 particles, which have a concave outer peripheral portion that extends along a distance not less than 10% of $d_{50}$ by TEM inspection, the concave outer peripheral portion having a negative radius of curvature as viewed from an interior of the particle.

26. A method for forming a ceramic particulate material, comprising:

combining boehmite and seeds, the seeds being present in an amount not less than 0.1 wt % with respect to the combined weight of the boehmite and the seeds;

converting the boehmite into alpha alumina particles by heat treatment, wherein the heat treatment comprises hot isostatic pressing (HIPing), wherein the alpha alumina particles have a specific surface area (SSA) not less than 15 m$^2$/g, and sphericity quantified by at least one of (i) a mean roundness not less than 0.710 as measured by Roundness Correlation Image Analysis, and (ii) a concavity less than 20%, wherein concavity is the percent of alpha alumina particles based on a sample of at least 100 particles, which have a concave outer peripheral portion that extends along a distance not less than 10% of d$_{50}$ by TEM inspection, the concave outer peripheral portion having a negative radius of curvature as viewed from an interior of the particle.

27. A method for forming a ceramic particulate material, comprising:

combining boehmite with alpha-alumina seeds, the alpha alumina seeds being present in an amount not less than 0.1 wt % with respect to the combined weight of the boehmite and the alpha-alumina seeds;

converting the boehmite into alpha alumina particles by heat treatment, wherein the heat treatment comprises hot isostatic pressing (HIPing), wherein the alpha alumina particles have a specific surface area (SSA) not less than 15 m$^2$/g, and sphericity quantified by at least one of (i) a mean roundness not less than 0.710 as measured by Roundness Correlation Image Analysis, and (ii) a concavity less than 20%, wherein concavity is the percent of alpha alumina particles based on a sample of at least 100 particles, which have a concave outer peripheral portion that extends along a distance not less than 10% of d$_{50}$ by TEM inspection, the concave outer peripheral portion having a negative radius of curvature as viewed from an interior of the particle.

* * * * *